(12) United States Patent
Keane

(10) Patent No.: US 8,645,017 B2
(45) Date of Patent: *Feb. 4, 2014

(54) DYNAMIC DISCOVERY OF VEHICLE COMMUNICATION INTERFACE DEVICE AND METHOD

(71) Applicant: Bosch Automotive Service Solutions LLC, Charlotte, NC (US)

(72) Inventor: Dennis P. Keane, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,452

(22) Filed: Oct. 2, 2012

(65) Prior Publication Data

US 2013/0030640 A1   Jan. 31, 2013

Related U.S. Application Data

(63) Continuation-in-part of application No. 12/116,309, filed on May 7, 2008, now Pat. No. 8,280,581.

(51) Int. Cl.
*G01M 17/00* (2006.01)

(52) U.S. Cl.
USPC ....... 701/29.1; 701/31.4; 701/32.7; 701/34.3; 701/34.4

(58) Field of Classification Search
USPC ............. 701/29.1, 31.4, 32.7, 34.3, 34.4
See application file for complete search history.

(56) References Cited

U.S. PATENT DOCUMENTS

| | | | |
|---|---|---|---|
| 5,387,870 | A | 2/1995 | Knapp et al. |
| 6,026,344 | A | 2/2000 | Franz |
| 6,526,340 | B1 | 2/2003 | Reul et al. |
| 6,603,394 | B2 | 8/2003 | Raichle et al. |
| 6,636,789 | B2 | 10/2003 | Bird et al. |
| 6,640,166 | B2 | 10/2003 | Liebl et al. |
| 6,728,603 | B2 | 4/2004 | Pruzan et al. |
| 6,747,552 | B2 | 6/2004 | Sparacino et al. |
| 6,823,243 | B2 | 11/2004 | Chinnadurai et al. |
| 6,874,680 | B1 | 4/2005 | Klaus et al. |
| 6,911,825 | B2 | 6/2005 | Namaky |
| 6,928,349 | B1 | 8/2005 | Namaky et al. |
| 6,937,926 | B2 | 8/2005 | Lipscomb et al. |
| 6,952,641 | B2 | 10/2005 | DiDomenico et al. |
| 6,969,983 | B2 | 11/2005 | Lipscomb et al. |
| 6,985,819 | B2 | 1/2006 | Lipscomb et al. |
| 6,988,053 | B2 | 1/2006 | Namaky |
| 7,024,476 | B1 | 4/2006 | Page et al. |
| 7,050,306 | B1 | 5/2006 | Ribeiro et al. |
| 7,069,125 | B2 | 6/2006 | Namaky et al. |
| 7,073,714 | B2 | 7/2006 | Namaky et al. |
| 7,089,096 | B2 | 8/2006 | Liebl et al. |

(Continued)

OTHER PUBLICATIONS

Office Action issued in Russian Patent Application No. 201050117.

*Primary Examiner* — Calvin Cheung
(74) *Attorney, Agent, or Firm* — Baker & Hostetler LLP

(57) ABSTRACT

A communications system that includes a vehicular diagnostic tool and a vehicle communication interface (VCI) configured to be connected to a vehicular computing system. In operation, the vehicular diagnostic tool automatically detects the presence of the VCI when the VCI is proximate thereto. Thereafter, the VCI and vehicular diagnostic tool communicate through a wireless connection. Also, a method of communicating using the aforementioned vehicular diagnostic tool and VCI.

20 Claims, 1 Drawing Sheet

(56) References Cited

U.S. PATENT DOCUMENTS

| | | |
|---|---|---|
| 7,105,741 B2 | 9/2006 | Banar et al. |
| 7,117,984 B2 | 10/2006 | Jordison et al. |
| 7,124,058 B2 | 10/2006 | Namaky et al. |
| 7,135,964 B2 | 11/2006 | Namaky et al. |
| 7,146,130 B2 | 12/2006 | Hsu et al. |
| 7,149,206 B2 | 12/2006 | Pruzan et al. |
| 7,183,945 B2 | 2/2007 | DiDomenico et al. |
| 7,209,813 B2 | 4/2007 | Namaky |
| 7,240,106 B2 | 7/2007 | Cochran et al. |
| 7,248,954 B2 | 7/2007 | Chinnadurai et al. |
| 7,305,289 B2 | 12/2007 | Gessner et al. |
| 7,324,346 B2 | 1/2008 | Ribeiro et al. |
| 7,324,550 B2 | 1/2008 | Klose et al. |
| 7,328,093 B1 | 2/2008 | Gessner et al. |
| 8,019,503 B2 * | 9/2011 | Andreasen et al. .......... 701/29.6 |
| 2002/0077781 A1 | 6/2002 | Liebl et al. |
| 2002/0133273 A1 * | 9/2002 | Lowrey et al. .................. 701/29 |
| 2002/0161867 A1 | 10/2002 | Cochran et al. |
| 2003/0139179 A1 | 7/2003 | Fuchs et al. |
| 2004/0176024 A1 | 9/2004 | Hsu et al. |
| 2005/0021200 A1 | 1/2005 | Taki |
| 2005/0065678 A1 * | 3/2005 | Smith et al. ..................... 701/29 |
| 2005/0097541 A1 * | 5/2005 | Holland ....................... 717/168 |
| 2005/0154500 A1 * | 7/2005 | Sonnenrein et al. .............. 701/1 |
| 2005/0251604 A1 | 11/2005 | Gerig |
| 2006/0041347 A1 | 2/2006 | Chinnadurai et al. |
| 2006/0041348 A1 | 2/2006 | Liebl et al. |
| 2006/0041349 A1 | 2/2006 | Chinnadurai et al. |
| 2006/0101311 A1 | 5/2006 | Lipscomb et al. |
| 2006/0106514 A1 | 5/2006 | Liebl et al. |
| 2007/0013507 A1 | 1/2007 | Sparacino |
| 2007/0198148 A1 | 8/2007 | Namaky |
| 2008/0004762 A1 * | 1/2008 | Seashore et al. ................ 701/29 |
| 2008/0065289 A1 | 3/2008 | Bertosa et al. |
| 2008/0140281 A1 * | 6/2008 | Morris et al. ................... 701/33 |
| 2008/0306645 A1 | 12/2008 | Dewhurst et al. |
| 2009/0276115 A1 | 11/2009 | Chen |

\* cited by examiner

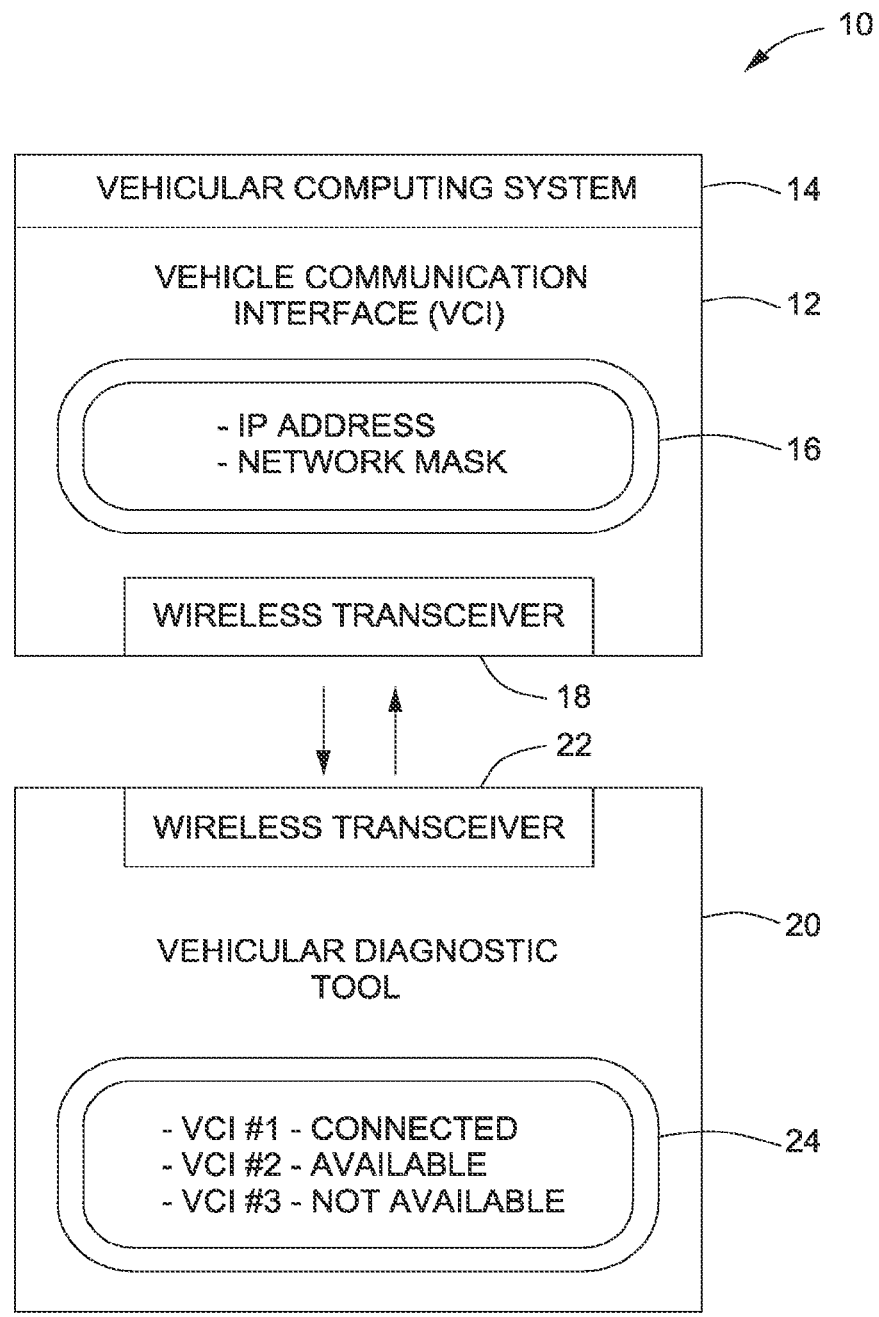

DYNAMIC DISCOVERY OF VEHICLE COMMUNICATION INTERFACE DEVICE AND METHOD

CROSS-REFERENCE TO RELATED APPLICATIONS

This application claims priority to and is a Continuation of application Ser. No. 12/116,309, filed on May 7, 2008, entitled "Dynamic Discovery of Vehicle Communication Interface Device and Method," now U.S. Pat. No. 8,280,581 issued Oct. 2, 2012, the disclosure of which is hereby incorporated by reference in its entirety.

FIELD OF THE INVENTION

The present invention relates generally to communications systems, components and methods. More particularly, the present invention relates to communications systems, components and methods that are configured to communicate with vehicles and/or vehicular systems.

BACKGROUND OF THE INVENTION

Modern vehicles (e.g., automobiles, watercraft, aircraft, trucks, motorcycles, agricultural machinery, industrial machinery, etc.) typically include a plurality of electro-mechanical systems that, together, allow for operation of the vehicle. For example, modern vehicles commonly include sophisticated transmission systems, fuel injection systems, anti-lock braking systems, air bag deployment systems, air-conditioning/heating systems, dashboard electronic systems, etc. Typically, each of these electro-mechanical systems is controlled using a separate vehicular computing system that utilizes a distinct communications protocol. Unfortunately, even vehicular computing systems located in the same vehicle do not generally utilize a common communications protocol to transmit data.

In view of the above, a device known as a vehicle communication interface (VCI) has been developed. The VCI is typically electronically connected to a vehicle and is configured to exchange data with a plurality of vehicular computing systems located within the vehicle. The VCI is also typically connected to and configured to exchange data with a vehicular diagnostic tool (i.e., a scan tool). The vehicular diagnostic tool, in turn, is designed to provide a mechanic or technician working on the vehicle (e.g., in a workshop or garage environment) with human-readable information about the status of one or more of the plurality of vehicular computing systems in the vehicle.

When in operation, the VCI typically communicates with the plurality of vehicular computing systems using a plurality of appropriate communication protocols. However, the VCI communicates with the vehicular diagnostic tool using a single communications protocol, which may differ from all of the protocols used by the vehicular computing systems. In effect, the VCI acts as a communication protocol translating mechanism between the vehicular computing systems and the vehicular diagnostic tool. As such, the VCI facilitates the flow of data from the plurality of vehicular computing systems to the vehicular diagnostic tool by providing the data forwarded by the vehicular computing system in a format useable/readable by the vehicular diagnostic tool.

Although most currently available VCI/vehicular diagnostic tool combinations are configured to be connected to each other via physical cables (e.g., Universal Serial Bus (USB) cables), some wireless VCI/vehicular diagnostic tool combinations are also currently available. However, in the currently available wireless combinations, both the VCI and the vehicular diagnostic tool must be manually pre-configured to recognize each other's respective Internet Protocol (IP) addresses before they may begin communicating with each other. This manual pre-configuration is relatively time-consuming, requires knowledge about wireless networks that is often not possessed by the mechanic or technician using the vehicular diagnostic tools (i.e., is relatively complex) and limits the ability to add, substitute or remove either a VCI or a vehicular diagnostic tool from the resultant wireless network.

SUMMARY OF THE INVENTION

At least in view of the above, it would be desirable to provide communications systems wherein vehicular diagnostic tools and VCIs are wirelessly connected to each other. It would also be desirable for the vehicular diagnostic tools and VCIs to either be capable of automatically detecting each other's presence or for the vehicular diagnostic tools to be capable of automatically detecting the presence of the VCIs. It would further be desirable to provide communication methods that allow for wirelessly connected vehicular diagnostic tools and VCIs to automatically detect each other.

The foregoing needs are met, to a great extent, by certain embodiments of the present invention. According to one such embodiment of the present invention, a communications system is provided. The communications system includes a vehicular diagnostic tool configured to wirelessly communicate with a vehicular computing system. The communications system also includes a vehicle communication interface (VCI) configured to convert a signal received from the vehicular computing system into a signal readable by the vehicular diagnostic tool and to wirelessly forward the signal readable by the vehicular diagnostic tool to the vehicular diagnostic tool, wherein the vehicular diagnostic tool is configured to automatically detect the VCI when the VCI is operating proximate to the vehicular diagnostic tool.

In accordance with another embodiment of the present invention, a communication method is provided. The method includes connecting a vehicle communications interface (VCI) to a vehicular computing system. The method also includes automatically detecting the VCI with a vehicular diagnostic tool when the VCI is operating proximate to the vehicular diagnostic tool. In addition, the method also includes wirelessly connecting the vehicular diagnostic tool to the VCI.

In accordance with yet another embodiment of the present invention, another vehicular communications system is provided. This communication system includes means for connecting a vehicle communications interface (VCI) to a vehicular computing system. This communication system also includes means for automatically detecting the VCI with a vehicular diagnostic tool when the VCI is operating proximate to the vehicular diagnostic tool. In addition, this communication system includes means for wirelessly connecting the vehicular diagnostic tool to the VCI.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a schematic diagram illustrating a communications system according to an embodiment of the present invention.

DETAILED DESCRIPTION

The invention will now be described with reference to the drawing figures, in which like reference numerals refer to like parts throughout. FIG. 1 is a schematic diagram illustrating a communications system 10 according to an embodiment of the present invention. The communications system 10 includes a vehicle communication interface (VCI) 12 that is connected to a vehicular computing system 14. The VCI 12 includes a user interface 16 that displays configuration parameters (e.g., the Internet Protocol (IP) address and Network Mask) of the VCI 12. The VCI 12 also includes a wireless transceiver 18.

The communications system 10 illustrated in FIG. 1 also includes a vehicular diagnostic tool 20 (e.g., a hand-held automotive scan tool, a properly configured personal computer with appropriate software, etc.) that is in wireless communication with the VCI 12. The vehicular diagnostic tool 20 includes a wireless transceiver 22 that communicates with the wireless transceiver 18 found in the VCI 12. The vehicle diagnostic tool 20 also includes a user interface 24 that is illustrated in FIG. 1 as listing a plurality of VCIs therein. More specifically, the user interface 24 lists VCI#1, which is the VCI illustrated in FIG. 1, and VCI#2 and VCI #3, which are not illustrated in FIG. 1 but which are located proximate to the vehicular diagnostic tool 20 (i.e., which are within the range of communication of the wireless transceiver 22). According to certain embodiments of the present invention, when a new VCI begins to operate proximate to the vehicular diagnostic tool 20 or when an existing VCI ceases to operate in that region, the list on user interface 24 is automatically updated.

The vehicular diagnostic tool 20 illustrated in FIG. 1 is configured to wirelessly communicate with the vehicular computing system 14 using the VCI 12 as an intermediary. The vehicular diagnostic tool 20 is also configured to communicate with other vehicular computing systems (not illustrated) that are either connected to the VCI 12 or that are connected to VCIs that are not illustrated in FIG. 1.

The VCI 12 illustrated in FIG. 1 is configured to convert a signal received from the vehicular computing system 14 also illustrated in FIG. 1 into a signal that is readable by the vehicular diagnostic tool 20. The VCI 12 is also configured to convert signals from any number of other vehicular computing systems which, although not illustrated in FIG. 1, may nonetheless also be connected to the VCI 12. The VCI 12 is further configured to wirelessly forward the converted signal (s) to the vehicular diagnostic tool 20.

The vehicular diagnostic tool 20 is configured to automatically detect the VCI 12 when the VCI 12 is turned on and/or operating proximate to the vehicular diagnostic tool 20. For example, according to certain embodiments of the present invention, the vehicular diagnostic tool 20 is configured to multicast a query for available VCIs (e.g., using the User Datagram Protocol (UDP)). According to some of these embodiments, available VCIs (e.g., the VCI 12 illustrated in FIG. 1) are configured to respond to the query by wirelessly communicating a configuration parameter to back to the vehicular diagnostic tool 20. Depending upon the particular embodiment of the present invention, the configuration parameter may include the connection status of the VCI 12 (e.g. "available," "unavailable" or "busy"), an IP address of the VCI 12, a network mask of the VCI 12 and a serial number of the VCI 12. Also, depending upon the embodiments of the present invention in question, more than one of the above-listed configuration parameters may be wirelessly communicated to the vehicular diagnostic tool 20.

As mentioned above, the vehicular diagnostic tool 20 includes the user interface 24 illustrated in FIG. 1. The user interface 24, in turn, is configured to list one or more VCIs therein, depending upon whether only a single VCI or a plurality of VCIs is detect as operating proximate to the vehicular diagnostic tool 20. According to certain embodiments of the present invention, the user interface 24 provides a user-readable drop-down menu that displays information about one or more of the multiple VCIs detected. For example, the user interface 24 may list the serial number of each VCI detected, the connection status of each VCI and/or one or more other VCI-distinguishing parameters.

Although only one vehicular computing system 14 is illustrated in FIG. 1 as being connected to the VCI 12, a plurality of vehicular computing systems are typically connected to the VCI 12. Also, although only the single VCI 12 is illustrated in FIG. 1 as being located proximate to the vehicular diagnostic tool 20, additional VCIs are often located proximate to the vehicular diagnostic tool 20 when in a garage or workshop environment. Two such additional VCIs are listed in the user interface 24 illustrated in FIG. 1 (i.e., VCI #2 and VCI #3).

According to certain embodiments of the present invention, a communication method is provided. This method may be implemented, for example, using components such as the VCI 12 and/or the vehicular diagnostic tool 20 illustrated in FIG. 1. According to certain embodiments of the present invention, this method includes connecting one or more VCIs to a vehicular computing system. In order to implement this step, the above-discussed VCI 12 may be connected not only to the vehicular computing system 14 but also to additional vehicular computing systems. Typically, each vehicular computing system is electronically connected to the VCI via a standard automotive connector (e.g., a J1962 connector).

Depending upon the embodiment of the present invention in question, the above-mentioned method may also include automatically detecting one or more VCIs with a vehicular diagnostic tool when the one or more VCIs are operating proximate to the vehicular diagnostic tool. According to certain embodiments of the present invention, this automatically detecting step includes multicasting a query for available VCIs using the vehicular diagnostic tool. Although this multicasting step may be performed a single time (e.g., when the vehicular diagnostic tool is turned on), according to some of these embodiments, the multicasting step is performed periodically until a least one VCI is detected. For example, the multicasting step may be performed every one second, 10 seconds, 30 seconds or any other time increment desired. Then, once one or more VCIs are detected, the query may still be periodically multicast (or at least sent to one or more of the known VCIs) in order to, for example, update the status of the VCIs located proximate to the vehicular diagnostic tool.

According to certain embodiments of the present invention, the above-discussed automatically detecting step includes responding to the query by wirelessly communicating a configuration parameter of the VCI to the vehicular diagnostic tool. This responding step may be implemented, for example, by wirelessly communicating the connection status of the VCI, an IP address of the VCI, a network mask of the VCI, a serial number of the VCI as the configuration parameter or some other unique VCI-identifying parameter. According to other embodiments of the present invention, more than one configuration parameter is wirelessly communicated.

The above-mentioned responding to the query step may be performed substantially at or immediately subsequent to the start-up of the VCI. However, the responding to the query step may also be performed at any other convenient time (e.g., when a vehicular diagnostic tool is turned on or positioned proximate to the VCI).

In addition to the above, the communication method may also include providing an operator interface that is configured to list multiple VCIs therein when more than one VCI is detected as operating proximate to the vehicular diagnostic tool. The operator interface may take any form that allows for the display of such a list. For example, the operator interface may be a touch-screen, an LCD display, etc. The operator interface, according to certain embodiments of the present invention, also lists one or more of the above-mentioned configuration parameters and/or unique VCI identifiers.

Also, according to certain embodiments of the present invention, a drop-down menu is included in the operator interface. According to some of these embodiments, the drop-down menu displays unique identification information about one or more of the multiple VCIs operating proximate to the vehicular diagnostic tool. From this drop-down menu (or some other list provided in or on the vehicular diagnostic tool) a technician or mechanic may select one of the VCIs in order to communicate therewith.

Once a VCI has been selected, some of the above-discussed communication methods include establishing an exclusive communication channel between the selected VCI and the vehicular diagnostic tool. Once such an exclusive communication channel is established, the vehicular diagnostic tool and the VCI may cease multicasting and sensing for multicast signals, respectively, until the channel is broken or until otherwise instructed by a mechanic, technician, wireless network administrator, etc. As an alternative, multicasting may continue even after an exclusive communication channel has been established. Among the advantages of such a continuation of the multicasting are the ability to continue to monitor the availability of VCIs that are operating proximate to the multicasting vehicular diagnostic tool and the ability to monitor the presence of VCIs that are either starting or ceasing to operate proximate to the vehicular diagnostic tool over time.

According to certain embodiments of the present invention, the above-discussed method also includes assigning individual IP addresses to the vehicular diagnostic tool and/or to the VCIs using Dynamic Host Configuration Protocol (DHCP). Because, in the method discussed above, the VCIs are discovered dynamically by the vehicular diagnostic tool, one or more of the assigned IP addresses may be allowed to change, without reconfiguring the VCI and/or the diagnostic tool. For example, a VCI may be turned off and may remain unused for a specified period of time. Then, when the VCI is turned on, the VCI may receive a different IP address than was previously assigned to it. With the dynamic discovery used according to certain embodiment of the present invention, the changed IP address involves no configuration changes in either the VCI or the diagnostic tool. This is in drastic contrast to currently available wireless VCI/vehicular diagnostic tool combinations where IP addresses cannot reasonably be allowed to change without reconfiguring the VCI and/or the diagnostic tool.

In addition to the above steps, the above-discussed method may also include displaying a unique host name on a first operator interface located on one of the VCIs and on a second operator interface located on the vehicular diagnostic tool. The displaying of such information facilitates a technician or mechanic selecting the appropriate VCI with which to communicate. For example, when implementing this step using the communications system 10 illustrated in FIG. 1, the IP address and Network Mask of the VCI 12 may, for example, be displayed in the user interface 16.

According to certain embodiments of the present invention, VCIs communicate and/or establish exclusive communication channels with vehicular diagnostic tools on a first-come-first-served basis. As such, a VCI may deny access to a vehicular diagnostic tool pursuant to receiving a status query by responding that it (i.e., the VCI in question) is unavailable. However, as will be appreciated by one of skill in the art upon practicing one or more embodiments of the present invention, particularly when a vehicular diagnostic tool queries periodically, a communication with a presently unavailable VCI may nonetheless be established at a later time, should the VCI eventually become available.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicular diagnostic communication device comprising:
   a vehicular diagnostic tool configured to automatically detect a vehicle communication interface (VCI) when the VCI is operating within communication range of the vehicular diagnostic tool;
   the vehicular diagnostic tool further configured to wirelessly communicate with a vehicular computing system by connecting with the VCI, the VCI configured to convert a signal received from the vehicular computing system into a signal readable by the vehicular diagnostic tool and configured to wirelessly transmit the signal readable by the vehicular diagnostic tool to the vehicular diagnostic tool; and
   the vehicular diagnostic tool is further configured to multicast a query for an available VCI, establish a connection with the available VCI in response to receiving a response to the query, and continue to multicast the query for other available VCIs to update a status of the VCIs proximate to the vehicular diagnostic tool.

2. The vehicular diagnostic communication device of claim 1, wherein the VCI is configured to respond to the query by wirelessly communicating a configuration parameter of the VCI to the vehicular diagnostic tool.

3. The vehicular diagnostic communication device of claim 2, wherein the configuration parameter comprises at least one of a connection status of the VCI, an Internet Protocol (IP) address of the VCI, a network mask of the VCI and a serial number of the VCI.

4. The vehicular diagnostic communication device of claim 1, wherein the vehicular diagnostic tool comprises a user interface configured to list multiple VCIs therein when more than one VCI is detected as operating proximate to the vehicular diagnostic tool.

5. The vehicular diagnostic communication device of claim 4, wherein the user interface comprises a drop-down menu that displays information about one or more of the multiple VCIs.

6. The vehicular diagnostic communication device of claim 1, wherein the vehicular diagnostic tool is configured to continue to multicast the query for available VCIs during the connection to update a status of the VCIs proximate to the vehicular diagnostic tool.

7. A vehicular diagnostic communication process comprising:
transmitting a multicast query for an available vehicle communications interface (VCI) with a vehicular diagnostic tool;
automatically detecting a VCI connected to a vehicular computing system with the vehicular diagnostic tool when the VCI is operating within communication range of the vehicular diagnostic tool;
wirelessly connecting the vehicular diagnostic tool to the VCI;
continuing to multicast the query for available VCIs; and
updating a status of the VCIs within communication range to the vehicular diagnostic tool.

8. The vehicular diagnostic communication process of claim 7, wherein the continuing to multicast step is performed periodically until the VCI is detected.

9. The vehicular diagnostic communication process of claim 8, further comprising:
periodically updating the query after the VCI has been detected.

10. The vehicular diagnostic communication process of claim 7, wherein the automatically detecting step further comprises:
responding to the query by wirelessly communicating a configuration parameter of the VCI to the vehicular diagnostic tool.

11. The vehicular diagnostic communication process of claim 10, wherein the responding step comprises:
wirelessly communicating at least one of a connection status of the VCI, an Internet Protocol (IP) address of the VCI, a network mask of the VCI and a serial number of the VCI as the configuration parameter.

12. The vehicular diagnostic communication process of claim 10, wherein the responding to the query step is performed substantially at startup of the VCI.

13. The vehicular diagnostic communication process of claim 7, further comprising:
providing a user interface configured to list multiple VCIs therein when more than one VCI is detected as operating proximate to the vehicular diagnostic tool.

14. The vehicular diagnostic communication process of claim 13, further comprising:
including a drop-down menu in the user interface, wherein the drop-down menu displays unique identification information about one or more of the multiple VCIs.

15. The vehicular diagnostic communication process of claim 7, further comprising:
establishing an exclusive communication channel between the VCI and the vehicular diagnostic tool.

16. The vehicular diagnostic communication process of claim 7, further comprising:
assigning Internet Protocol (IP) addresses to the vehicular diagnostic tool and to the VCI using standard network configurations.

17. The vehicular diagnostic communication process of claim 16, wherein the assigning Internet Protocol (IP) addresses step comprises at least one of assigning protocol addresses statically and using a Dynamic Host Configuration Protocol (DHCP) server.

18. The vehicular diagnostic communication process of claim 16, further comprising:
allowing one or more of the IP addresses to change when unused for a specified period of time without requiring reconfiguring of the VCI or the vehicular diagnostic tool.

19. The vehicular diagnostic communication process of claim 7, further comprising:
displaying a unique host name on a first user interface located on the VCI and on a second user interface located on the vehicular diagnostic tool.

20. The vehicular diagnostic communication process of claim 7, wherein the continuing to multicast the query for available VCIs takes place while there is an established connection to update a status of the VCIs proximate to the vehicular diagnostic tool.

* * * * *